US006253447B1

(12) United States Patent
Nakamura et al.

(10) Patent No.: US 6,253,447 B1
(45) Date of Patent: *Jul. 3, 2001

(54) METHOD OF MANUFACTURING THERMAL HEAD

(75) Inventors: Yuji Nakamura; Yoshinori Sato; Yoshiaki Saita, all of Chiba (JP)

(73) Assignee: Seiko Instruments Inc. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,318

(22) Filed: Mar. 16, 1999

Related U.S. Application Data

(62) Division of application No. 08/669,299, filed on Jul. 15, 1996.

(30) Foreign Application Priority Data

Oct. 31, 1994 (JP) .......... 6-267424

(51) Int. Cl.[7] .......... H05B 3/10; C03C 17/34

(52) U.S. Cl. .......... 29/611; 29/890.1; 216/27; 216/87; 216/102

(58) Field of Search .......... 29/611, 890.1, 29/847; 216/18, 27, 39, 87, 102, 103; 347/203, 208; 438/924

(56) References Cited

U.S. PATENT DOCUMENTS

| | | | | |
|---|---|---|---|---|
| 4,064,074 | * | 12/1977 | Ellis | 29/611 |
| 4,096,510 | | 6/1978 | Arai et al. | 219/216 |
| 4,634,494 | * | 1/1987 | Taji et al. | 216/87 |
| 4,719,477 | | 1/1988 | Hess | 347/50 |
| 4,902,377 | * | 2/1990 | Berglund et al. | 216/18 |
| 5,087,591 | * | 2/1992 | Teng | 216/18 |
| 5,252,182 | | 10/1993 | Hong | 156/655 |
| 5,275,695 | * | 1/1994 | Chang et al. | 216/27 |
| 5,439,554 | | 8/1995 | Tamura et al. | 216/16 |
| 5,979,040 | * | 11/1999 | Houki | 29/611 |

FOREIGN PATENT DOCUMENTS

| | | | | |
|---|---|---|---|---|
| 299735 | | 1/1989 | (EP) . | |
| 518467A2 | | 12/1992 | (EP) . | |
| 60-47940 | * | 2/1994 | (JP) | 29/611 |

OTHER PUBLICATIONS

Smith, W.F., Principles of Materials Science and Engineering, , McGraw–Hill, Inc., pp. 173–184, 1986.*

Patent Abstracts of Japan, vol. 3, No. 40, (E–102) Apr. 6, 1979.

Patent Abstracts of Japan, vol. 13, No. 244, (M–834) [3592] Jun. 7, 1989.

Patent Abstracts of Japan, vol. 14, No. 196, (M–964) [4139] Apr. 20, 1990.

Patent Abstracts of Japan, vol. 7, No. 159, (M–228) [1304] Jul. 13, 1983.

Patent Abstracts of Japan, vol. 6, No. 83, (M–130) May 21, 1982.

Patent Abstracts of Japan, vol. 18, No. 272, (M–1610) May 24, 1994.

* cited by examiner

*Primary Examiner*—Lee Young
*Assistant Examiner*—A. Dexter Tugbang
(74) *Attorney, Agent, or Firm*—Adams & Wilks

(57) ABSTRACT

A method for manufacturing a thermal head comprises forming a heat generating resistor on an insulative substrate, and disposing conductors having different material properties on the heat generating resistor for supplying power to the heat generating resistor. The conductors are then etched to form a wiring electrode having a tapered peripheral edge portion as a result of the different material properties of the conductors. A protective film is then formed over the heat generating resistor and the wiring electrode.

13 Claims, 16 Drawing Sheets enlarged sectional view of heat generating portion sectional view of peripheral edge of electrode

| taper angle ( deg ) | printing durability | resistance to pulse | resistance to corrosion | resistance to scratch |
|---|---|---|---|---|
| 90 | × | △ | × | × |
| 60 | × | ○ | △ | × |
| 30 | △ | ○ | ○ | ○ |
| 15 | ◎ | ◎ | ◎ | ◎ |
| 8 | ◎ | ◎ | ◎ | ◎ |

FIG. 17

| taper angle ( deg ) | Vickers hardness of protective film Hv | | | |
|---|---|---|---|---|
| | 900 | 1200 | 1500 | 1800 |
| 90 | × | × | × | × |
| 60 | △ | △ | × | × |
| 30 | △ | ○ | ○ | ○ |
| 15 | △ | ◎ | ◎ | ◎ |
| 8 | △ | ◎ | ◎ | ◎ |

FIG. 18

METHOD OF MANUFACTURING THERMAL HEAD

The present application is a divisional of U.S. application Ser. No. 08/669,299, filed on Jul. 15, 1996, which is hereby incorporated by reference, and priority thereto for common subject matter is hereby claimed.

TECHNICAL FIELD

The present invention relates to a thermal head which is used in heat sensitive recording of facsimile, printer or the like and a method for manufacturing the same.

BACKGROUND TECHNIQUES

Conventionally, as illustrated in FIGS. 10(*a*) and 10(*b*), a glaze layer 2 is provided as a heat accumulation layer on an insulative substrate 1 such as that made of ceramic material. Then, film formations are performed by sputtering or deposition from a heat generating resistor material such as that of Ta system, silicide system, Ni-Cr system or the like and an electrode material such as that of Al, Cr-Cu or Au, whereupon a heat generating resistor 3 and wiring electrodes 12 composed of a common electrode and individual electrodes are formed through performance of patterning in the photolithographing step. Thereafter, in order to prevent oxidation of and provide wear resistance with respect to the heat generating resistor 3, a protective film 9 such as that made of $SiO_2$, $Ta_2O_5$, SiAlON, $Si_3N_4$ or SiC is formed by sputtering, ion plating or CVD (Chemical Vapor Deposition) to thereby manufacture a thermal head.

However, in the conventional method for manufacturing a thermal head, since the sectional configuration of a peripheral edge portion of each of the wiring electrodes 12 composed of a common electrode and individual electrodes is almost orthogonal, similar difference in level occurs also in the surface of the protective film 9. In addition, due to a difference in growth process between a protective film for the heat generating resistor 3 and that for the wiring electrode 12 when this protective film is formed, a fault 10 at which the film continuity as viewed in the plane direction is discontinued occurs in the protective film layer.

For this reason, the thermal head that had been manufactured by the above-mentioned manufacturing method had its resistance value increased early in its use, with the result that when printing was performed using this thermal head, such increase in resistance value became a cause of dotting failures, which resulted in that the printing run service life of the thermal head became shorter. Also, it is considered that during printing run, ions in the thermosensible paper, moisture, $Na^+$ ion and $Cl^-$ ion in the atmosphere, and the like enter into the thermal head due to the faults 10 of the protective film thereof, with the result that there was the problem that the heat generating resistor 3 and wiring electrodes 12 were corroded and as a result the thermal head had inferior corrosion resistance.

As conventional examples of solving the above-mentioned problems, a manufacturing method wherein a forward end portion of each wiring electrode 12 connected to a heat generating resistor 3 is tapered to thereby decrease the fault and level difference of the protective film (e.g., Published Unexamined Japanese Patent Application No. S-56-129184), a manufacturing method wherein a photo-step and etching step are performed twice or so with respect to a forward end portion of each wiring electrode 12 connected to a heat generating resistor 3 to thereby form this forward end portion into a two-stepped configuration and thereby decrease the level difference of the protective film (e.g., Published Examined Japanese Patent Application No. S-55-30468), a manufacturing method wherein high frequency bias sputtering is added during formation of the protective film to thereby prevent generation of cracks (e.g., Published Unexamined Japanese Patent Application No. S-63-135261), etc. have been made publicly known.

However, while in the conventional thermal head a wiring electrode thereof was such that a specific configuration was imparted to only a forward end portion thereof that is connected to the heat generating resistor, the effect thereof upon enhancement of the printing durability and reliability was not sufficient. Namely, faults and level differences in the protective film that result from the level differences in the wiring electrode occur not only in the portion thereof that corresponds to the forward end portion of the wiring electrode connected to the heat generating resistor but also in the portion thereof that corresponds to an entire peripheral edge portion of the wiring electrode in at least a protective-film region.

On the other hand, if the above-mentioned level differences exist, the protective film 9 is likely to be partly broken off or exfoliated from faults 10 thereof due to mechanical stress that is applied to the level difference portion thereof by sliding movement of the thermosensible paper and pressing force of a platen roller or due to thermal stress that results from a difference in thermal coefficient of expansion between the heat generating resistor portion and the electrode portion. Accordingly, the effect of the sliding movement of the thermosensible paper and pressing force of the platen roller is exerted not only upon the heat generating resistor but also upon the surrounding areas thereof, with the result that the protective film is likely to be broken off or exfoliated also by way of the peripheral edge portion of the wiring electrode other than the forward end portion thereof. Also, even when scratches have been made by foreign substances having attached to the thermosensible paper or the like, these foreign substances are caught by the level difference portion of the wiring electrode, with the result that, similarly, exfoliation or the like of the protective film is likely to occur also from a portion of the electrode other than the forward end thereof.

As mentioned above, the protective film was broken off or exfoliated not only from the forward end portion of the electrode but also from the peripheral edge thereof, whereby the printing run service life of the thermal head was caused to become shorter.

Also, while material having high hardness has on one hand been recently used as material of the protective film in order to improve the wear resistance thereof, emphasis has on the other hand been placed on the above-mentioned problems. Particularly, when cladding is applied using a hard protective film, the thermal head cannot receive an external force with high flexibility and it is also difficult to ease the stress. Accordingly, there was the problem that the phenomenon such as exfoliation or the like of the protective film was likely to become prominent.

Conversely, when the hardness of the protective film is low, the wear resistance becomes inferior, with the result that the heat generating resistor is damaged due to wear of the protective film and therefore the printing run service life can no longer be expected to be improved.

Also, there is the likelihood that during printing run, ions in the thermosensible paper, moisture, $Na^+$ ion and $Cl^-$ ion in the atmosphere, and the like may enter into the thermal head due to the level difference of the peripheral edge of the electrode. As a result, there was the problem that this entry corroded the heat generating resistor and electrode, with the result that the thermal head became inferior in terms of the corrosion resistance particularly during standby for printing.

Accordingly, an object of the present invention is to provide a thermal head which is arranged such that, in order to solve the above-mentioned conventional problems, the peripheral edge portion of the electrode thereof is tapered and the level difference on the surface of the protective film is thereby lessened to thereby have no fault therein while having wear resistance, on the other hand.

DISCLOSURE OF THE INVENTION

The present invention is directed to providing a thermal head having on an insulative substrate at least a heat generating resistor, wiring electrodes for supplying power to the heat generating resistor and a protective film for clothing the heat generating resistor and the wiring electrodes in ambient areas thereof, wherein the sectional configuration of the wiring electrodes that are in at least a protective-film region near the heat generating resistor is tapered to thereby make less sharp a difference in level of the wiring electrodes with respect to the surface of the substrate and the hardness Hv of the protective film to be clad is made to be 1200 $kg/mm^2$ (Hv 1200) or more in terms of the Vickers hardness.

In the above-constructed thermal head, since the difference in level between the surface of the insulative substrate and the peripheral edge portion of each wiring electrode is gently tapered, the clothability of the protective film is increased with the result that the faults which were likely to occur at the peripheral edge portion of each wiring electrode cease to exist, whereby the protective film comes to have continuity in the plane direction. Further, even when the hardness of the protective film is made as high as Hv 1200 or more in terms of the Vickers hardness, troubles that occur due to exfoliation of the protective film that is made from faults therein which were conventionally likely to occur at the peripheral edge portion of the wiring electrode can be suppressed. Nor does there occur entry of corroding ions or the like into the protective film from the fault portion thereof. As a result, the printing run durability is not only improved, but the environmental reliability is also improved simultaneously.

BRIEF DESCRIPTION OF THE DRAWINGS

FIG. 17 is a table showing results of evaluation made in the embodiment of the present invention; and FIG. 18 is a table showing results of evaluation concerning a scratch test performed according to the present invention.

BEST MODE FOR CARRYING OUT THE INVENTION

[First Embodiment]

Figure 1:
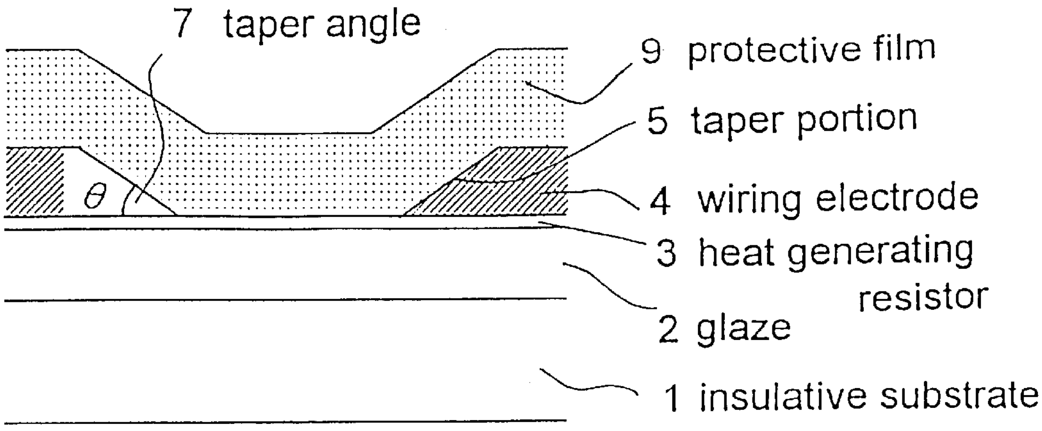
FIGS. 1(*a*) and 1(*b*) are an enlarged sectional view illustrating a heat generating portion of a thermal head according to the present invention and a sectional view illustrating peripheral edge portions of electrodes thereof respectively.
Figure 1:
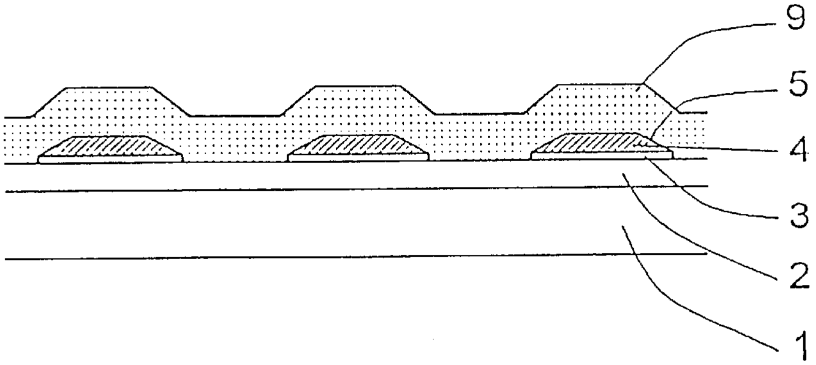

FIG. 1(*a*) is an enlarged sectional view illustrating a heat generating resistor and its ambient area of a thermal head according to the present invention and FIG. 1(*b*) is a sectional view illustrating peripheral edge portions of electrodes thereof.

In these figures, a glaze 2 is formed on the surface of an insulative substrate 1 and wiring electrodes 4 are formed thereon so as to be electrically connected to a heating-element layer such as a heat generating resistor 3. A reference numeral 5 denotes a taper portion of each wiring electrode 4. This taper portion is formed with respect to a periphery thereof that opposes the heat generating resistor 3 and with respect to a peripheral edge portion of every wiring electrode 4. A reference numeral 9 denotes a protective film which is formed so as to clothe the heat generating resistor 3 and the peripheral edge portions of the wiring electrodes 4. By the section of the peripheral edge of the wiring electrode 4 being tapered, when the protective film 9 has been formed, the protective film is made to have no level difference resulting from the level difference of the wiring electrode 4 and have, by the resulting removal of the difference between the growth process thereof on the heat generating resistor 3 and the growth process thereof on the wiring electrodes 4, no fault resulting therefrom.

Figure 2:
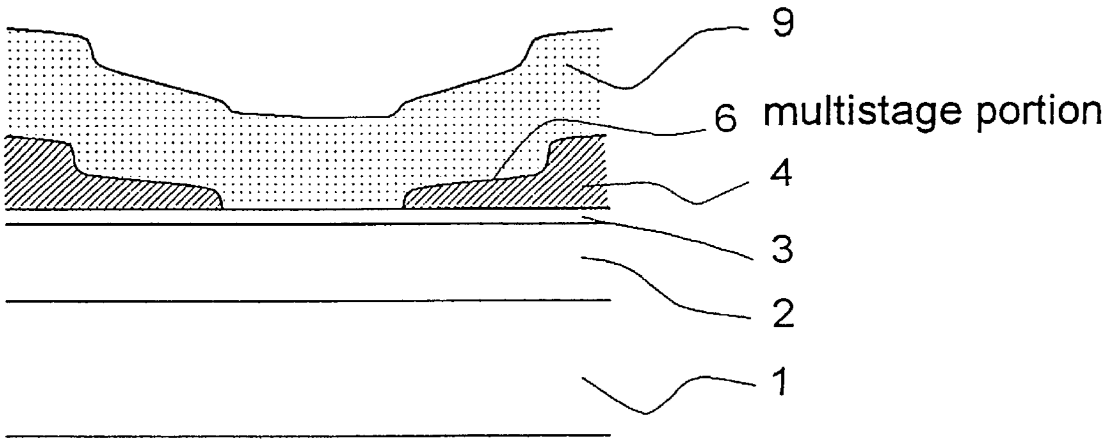
FIGS. 2(*a*) and 2(*b*) are an enlarged sectional view illustrating a heat generating portion of a thermal head according to the present invention and a sectional view illustrating peripheral edge portions of electrodes thereof respectively.
Figure 2:
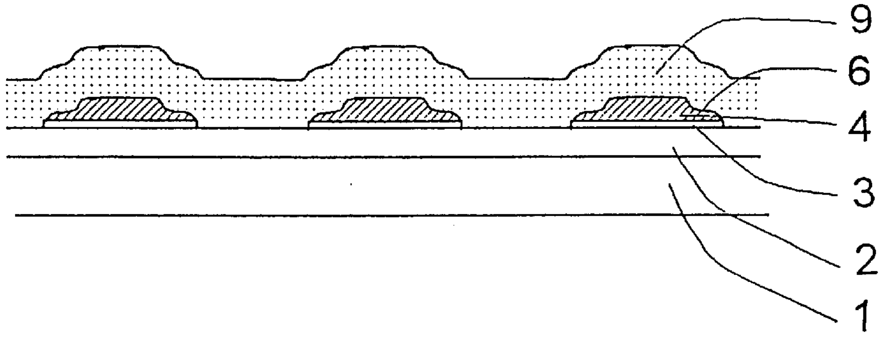
Figure 3A:
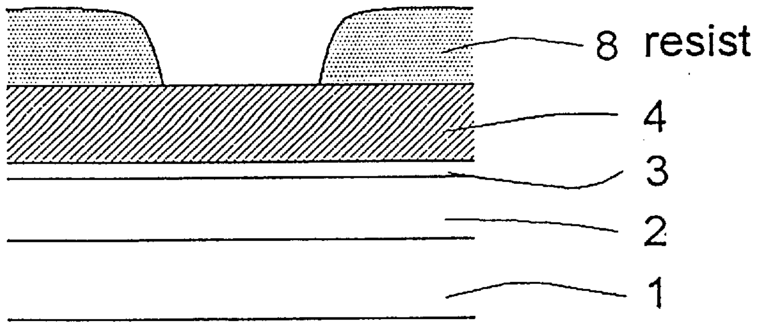
FIGS. 3(*a*) to 3(*d*) are explanatory views illustrating manufacturing process steps for manufacturing the thermal head according to the present invention.
Figure 3B:
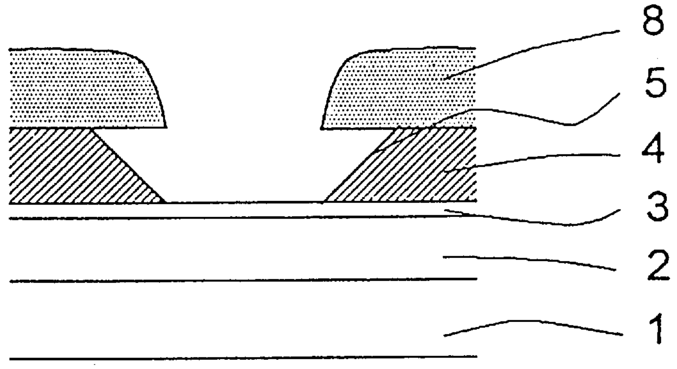
Figure 3C:
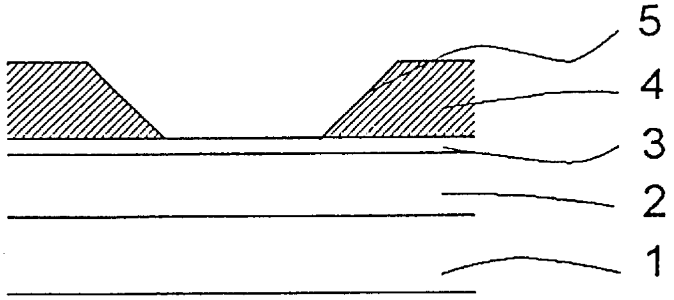
Figure 3D:
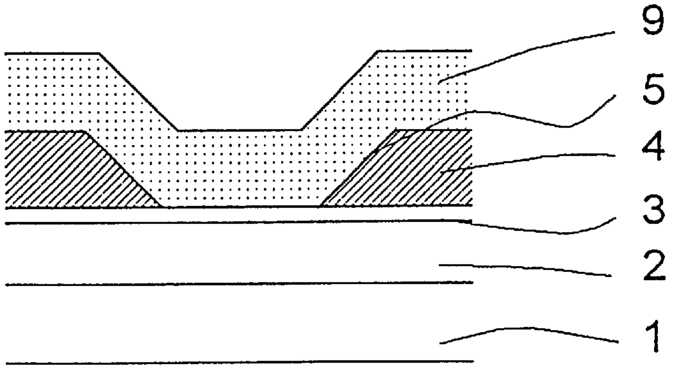
Figure 4A:
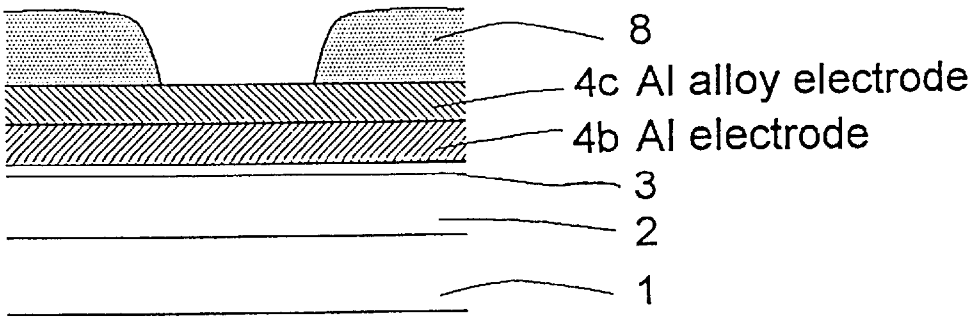
FIGS. 4(*a*) to 4(*d*) are explanatory views illustrating manufacturing process steps for manufacturing the thermal head according to the present invention.
Figure 4B:
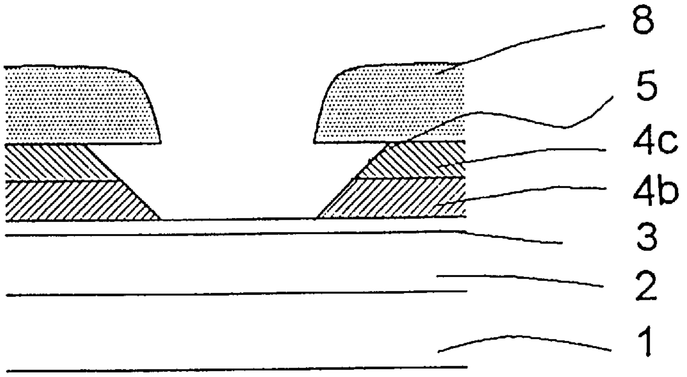
Figure 4C:
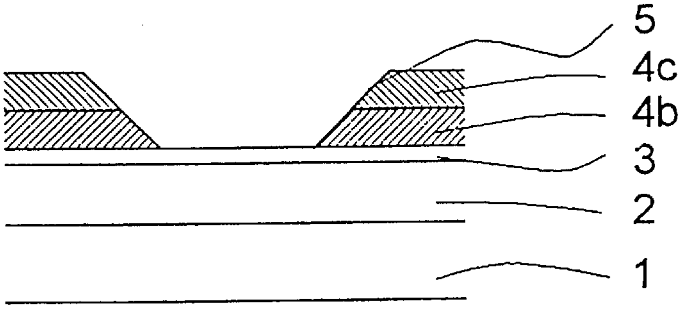
Figure 4D:
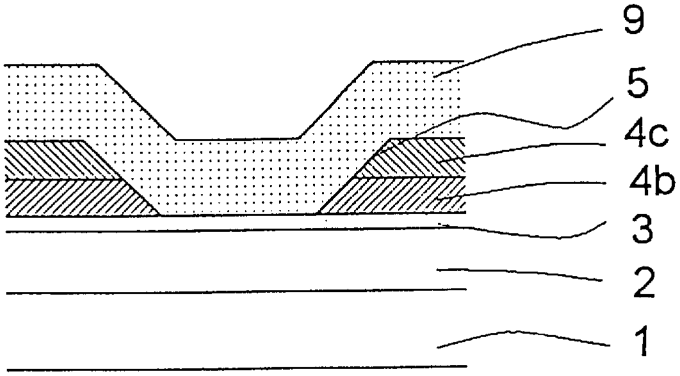
Figure 5A:
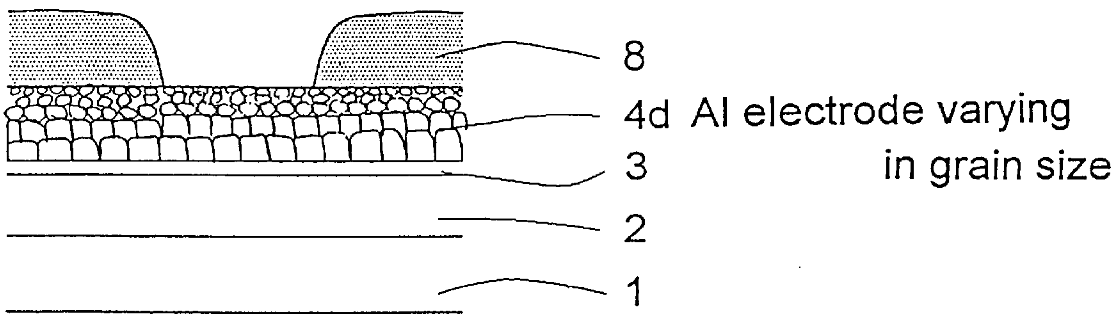
FIGS. 5(*a*) to 5(*d*) are explanatory views illustrating manufacturing process steps for manufacturing the thermal head according to the present invention.
Figure 5B:
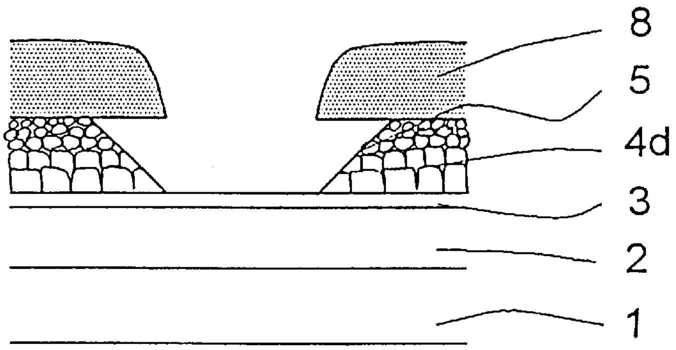
Figure 5C:
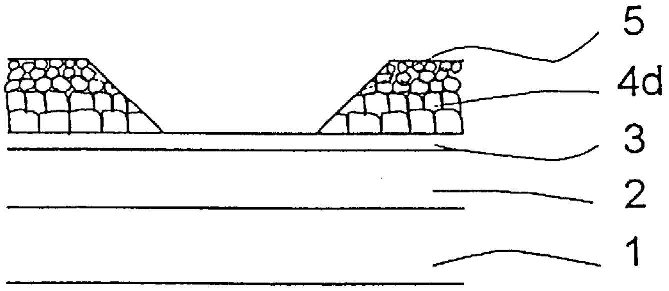
Figure 5D:
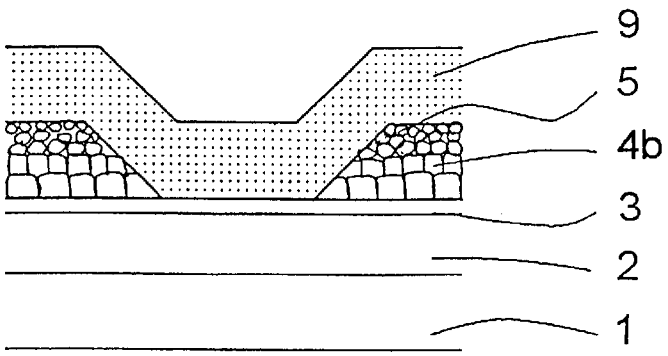
Figure 6A:
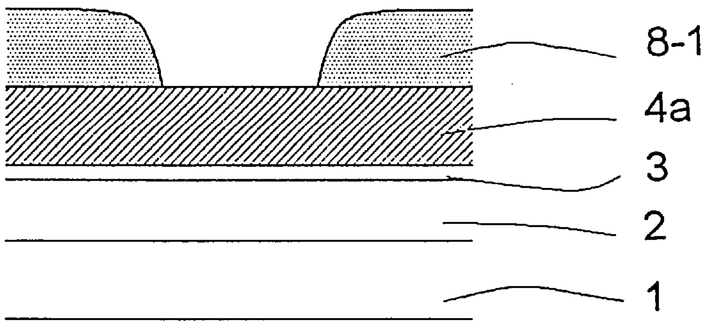
FIGS. 6(*a*) to 6(*d*) are explanatory views illustrating manufacturing process steps for manufacturing the thermal head according to the present invention.
Figure 6B:
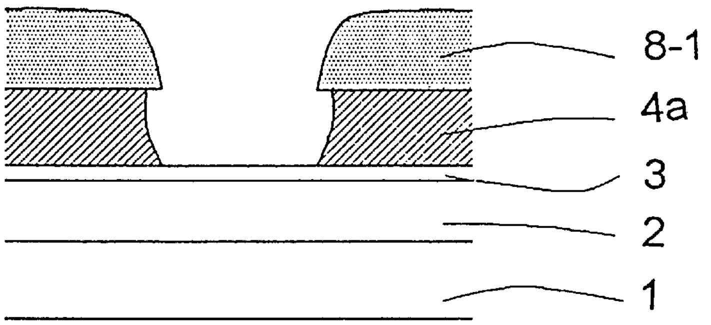
Figure 6C:
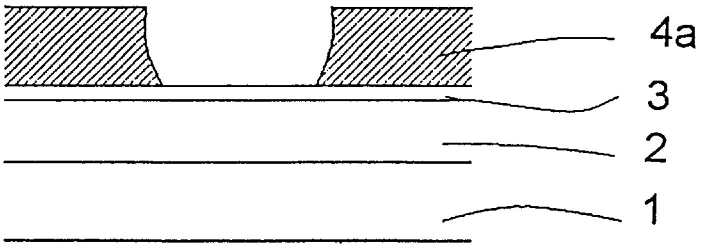
Figure 6D:
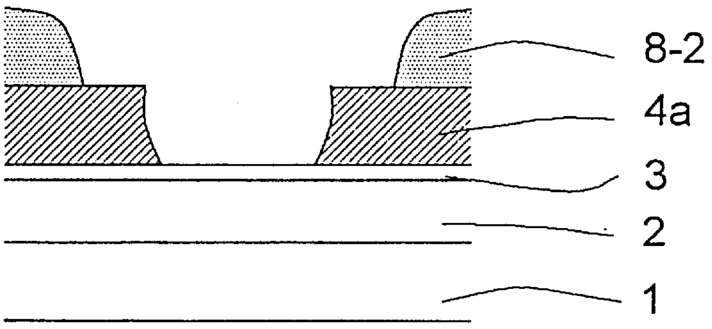

Also, in the sectional views of FIGS. 2(*a*) and 2(*b*), a glaze 2 is formed on the surface of the insulative substrate 1. On the surface of this glaze 2 there is further formed the heat generating resistor 3 on which the wiring electrodes 4 are formed so as to be electrically connected thereto. A reference numeral 6 denotes a multistage portion which is formed with respect to a periphery thereof that opposes the heat generating resistor 3 and with respect to a peripheral edge portion of every wiring electrode 4.

The reference numeral 9 denotes the protective film which is formed so as to cover this multistage portion as a whole.

By the peripheral edge portion of the wiring electrode 4 being formed into a multistage configuration, when the protective film 9 has been formed, the protective film is made to have no level difference resulting from the level difference of the wiring electrode 4 and have, by the resulting removal of the difference between the growth process thereof on the heat generating resistor 3 and the growth process thereof on the wiring electrodes 4, no fault resulting therefrom.

Explaining the manufacturing process steps according to the invention of this application sequentially, as illustrated in FIG. 3(*a*), for the purpose of heat accumulation, the glaze 2 is formed on the insulative substrate 1 that consists of, for example, alumina ceramics. Next, a film that is made of material Ta-N, Ta-$SiO_2$ or the like that has Ta as a main component and that serves as material of the heat generating resistor is formed by sputtering to a thickness of approximately 0.1 μm or so, after which the heat generating resistor 3 is formed by photolithography. Subsequently, a film that is made of material Al, Al-Si, Al-Si-Cu or the like that has Al as a main component and that serves as material of the electrode for supplying power to the heat generating resistor 3 is formed by sputtering or the like to a thickness of approximately 1 to 2 μm or so, after which a photo-resist is coated on the resulting film and then is exposure developed using a photo-mask to thereby form a resist 8 that has a configuration of wiring electrodes.

Next, in FIG. 3(*b*), in an etching solution prepared by adjusting the viscosity of an acidic water mixed solution composed of phosphoric acid, acetic acid, nitric acid, pure wate, etc. by adjusting the mixing ratio thereof, when etching the Al film with an etching solution having a low viscosity, this etching solution not only performs Al etching but also is simultaneously carried into an interface between the resist 8 and Al, whereby etching proceeds also in the plane direction of the conductor layer. When the relationship between the etching rate in this plane direction and that in the thicknesswise direction is made to be appropriate, at the time of completion of the etching it is possible to make the peripheral edge portion of the electrode have the taper portion 5.

Thereafter, in FIG. 3(*c*), the resist 8 is removed using an exfoliation solution such as organic solvent to thereby form the wiring electrodes and taper portion 5.

Next, as illustrated in FIG. 3(*d*), in order to prevent oxidation of and provide wear resistance to the heat generating resistor 3 and wiring electrodes 4, a film that is made of, for example, a mixture of $Si_3N_4$ and $SiO_2$ is clad by sputtering or the like to a thickness of approximately 3 to 6 μm or so to thereby form the protective film 9.

In the thermal head that is obtained through performance of the above-mentioned process steps, since the peripheral edge portion of the wiring electrode is prevented from being formed into a configuration of cliff and is formed into an appropriately tapered slant surface, it is unlikely that faults occur in the portion of the protective film clothing this taper surface 5 of the wiring electrode that corresponds to the peripheral edge thereof.

Particularly, since sputtering has an inferior characteristic of clothing a level difference, a prominent difference in terms of the clothability of the protective film occurs between the thermal head of the present invention and the conventional thermal head, whose protective films are both formed by sputtering. This effect will be described later jointly with the results of evaluation.

[Second Embodiment]

Next, an explanation will be given of the manufacturing process steps wherein the peripheral edge portion of the wiring electrode is tapered with materials thereof each having Al as a main component being made multilayer as illustrated in FIGS. 4(*a*) to 4(*d*).

In FIG. 4(*a*), as in the case of the first embodiment, the glaze 2 is formed on the insulative substrate 1 such as that made of alumina ceramics or the like and on this glaze 2 there is formed the heat generating resistor 3. Subsequently, an Al electrode **4*b* film that has Al as a main component and that serves as an electrode material for supplying power to the heat generating resistor 3 is formed as a first layer by sputtering to a thickness of approximately 0.3 to 0.8 μm or so and then an Al alloy electrode 4*c* film which has Al as a main component and has Si, Cu, Ti and the like added thereto is formed as a second layer by sputtering to a thickness of approximately 0.3 to 0.6 μm or so to thereby form an electrode film having a total thickness of approximately 1 to 2 μm. Thereafter, the resist 8** is formed as in the case of the first embodiment.

Next, in FIG. 4(*b*), when etching is performed of the first and second layers by use of an etching solution that consists of an acidic water mixed solution composed of phosphoric acid, acetic acid, nitric acid, pure water, etc., since as compared to the Al electrode **4*b* film as the first layer having Al as a main component the Al alloy electrode 4*c* film as the second layer wherein Si, Cu, Ti and the like has been added to Al has its crystal grain size made to be very small, the etching rate for this second layer becomes faster. For this reason, etching as viewed in both the plane and thickness directions proceeds, whereby at the etch completion time the peripheral edge portion of the electrode exhibits a tapered configuration. Thereafter, in FIG. 4**(*c*), the resist 8 is removed using an exfoliation solution such as organic solvent to thereby form the wiring electrode and taper portion 5. Thereafter, as in the case of the above-mentioned embodiment, in FIG. 4(*d*), the protective film 9 is formed.

[Third Embodiment]

Next, the process steps wherein the crystal grain size of the electrode is caused to vary in the thicknesswise direction and the electrode is thereby tapered as illustrated in FIGS. 5(*a*) to 5(*d*) will be explained. In FIG. 5(*a*), as in the case of the first embodiment, the glaze 2 is formed on the insulative substrate 1 such as that made of alumina ceramics or the like and on the upper surface of this glaze 2 there is formed the heat generating resistor 3. On the upper surface of the resulting structure there is further formed by sputtering to a thickness of from 1 to 2 μm a film that has Al as a main component and that serves as an electrode material for supplying power to the heat generating resistor 3. At this time, the crystal grain size of Al varies due to sputter DC power, substrate temperature, sputter pressure, etc. The crystal grain size of an ordinary Al sputter film is in a range of from 2 to 4 μm. In this embodiment, by controlling the sputter DC power and substrate temperature, the crystal grain size thereof was varied to thereby form an Al electrode 4*d* film whose crystal grain size varied. In an initial period of the film formation, film formation was performed under ordinary conditions and, as the time lapsed, film formation was performed while the sputter DC power was being gradually decreased. Since the film forming rate was decreased by the sputter power being decreased, the substrate temperature was decreased. At this time, the crystal grain size in the vicinity of the upper surface of Al was 0.5 μm whereas that in the vicinity of the lower surface thereof was approximately 2 μm or so. Then, on the upper surface of the resulting structure there was formed the resist 8.

Next, in FIG. 5(*b*), when Al is etched using an etching solution that consists of, for example, a mixed solution of phosphoric acid, acetic acid, nitric acid and pure water, the etching rate varies due to the variations in crystal grain size in the thicknesswise direction of the film. Namely, the smaller the crystal grain size, the faster the etching rate. For this reason, since etching is performed in both the plane and thickness directions, the peripheral edge portion of the electrode exhibits a configuration of taper at the etch completion time. Thereafter, in FIG. 5(*c*), the resist 8 is removed using an exfoliation solution such as organic solvent to thereby form the wiring electrode and taper portion 5. Thereafter, as in the case of the above-mentioned embodiment, in FIG. 5(*d*), the protective film 9 is formed.

[Fourth Embodiment]

Next, the manufacturing process steps wherein the resist forming and etching steps are each performed a plurality of times as illustrated in FIGS. 6(*a*) to 6(*d*) to thereby make the peripheral edge portion of the wiring electrode multistage, thereby obtaining an effect similar to that attainable with tapering of the electrode will be explained.

Figure 7A:
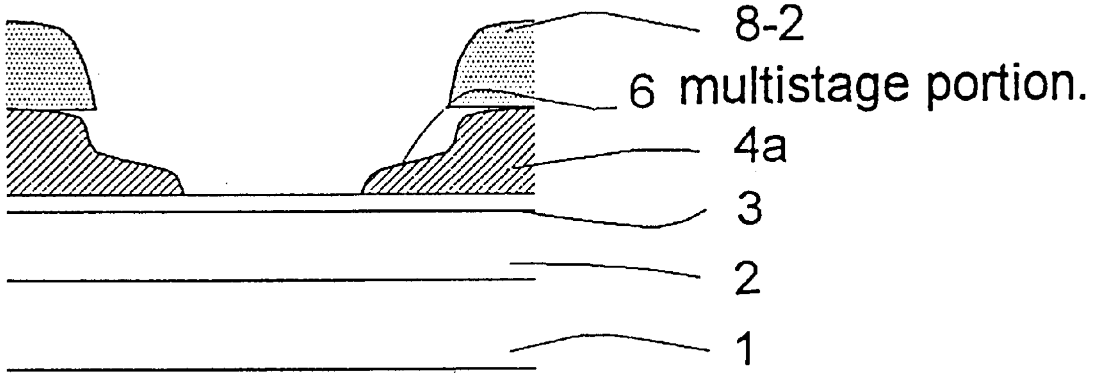
FIGS. 7(*a*) to 7(*c*) are explanatory views illustrating manufacturing process steps for manufacturing the thermal head according to the present invention.
Figure 7B:
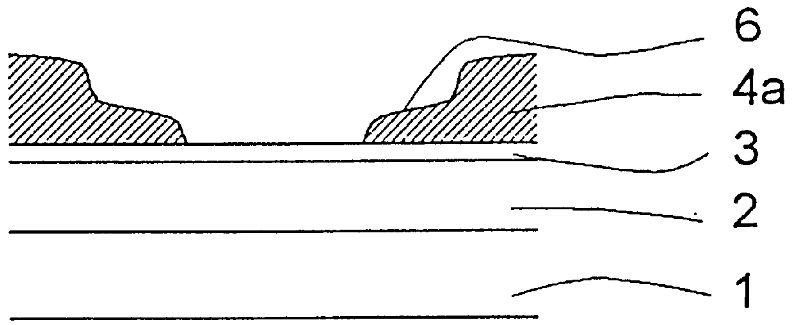
Figure 7C:
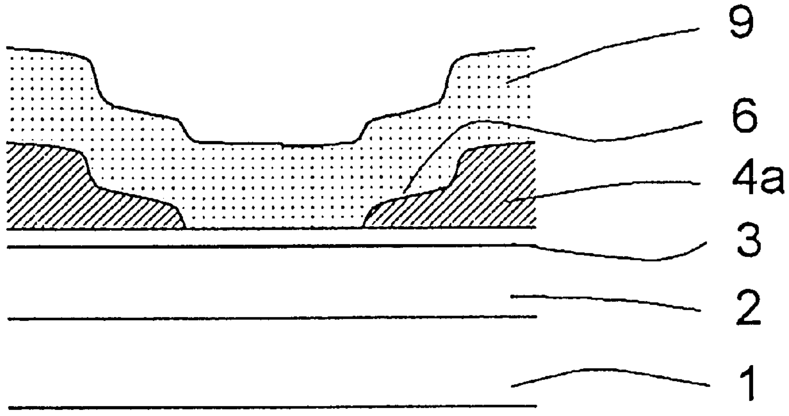
Figure 8A:
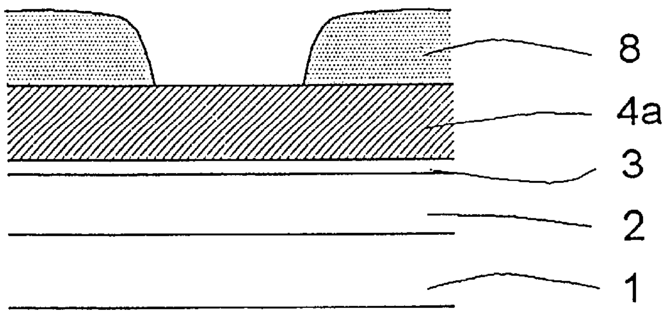
FIGS. 8(*a*) to 8(*d*) are explanatory views illustrating manufacturing process steps for manufacturing the thermal head according to the present invention.
Figure 8B:
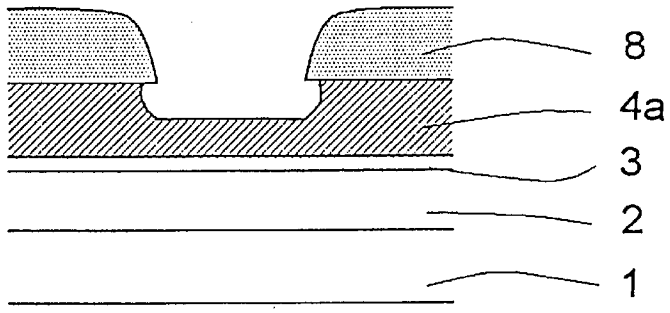
Figure 8C:
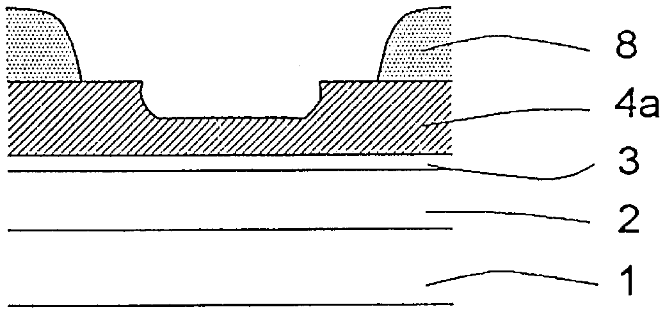
Figure 8D:
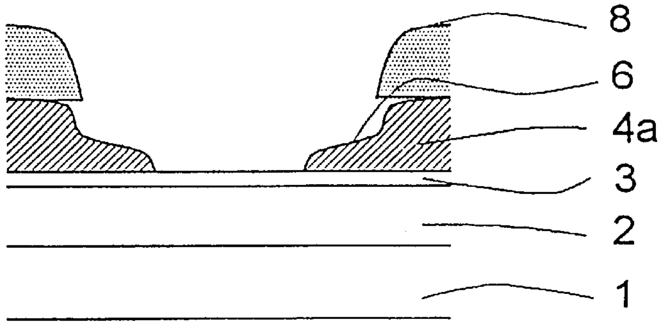

In FIG. 6(*a*), as in the case of the first embodiment, the glaze 2 is formed on the insulative substrate 1 such as that made of alumina ceramics or the like and on the upper surface of this glaze 2 there is formed the heat generating resistor 3. On the upper surface of the resulting structure there is further formed by sputtering to a thickness of from 1 to 2 μm a film that has Al as a main component and that serves as an electrode material for supplying power to the heat generating resistor 3. Thereafter, after formation of a resist 8-1, in FIG. 6(*b*), ordinary etching is performed using an etching solution that consists of, for example, an acidic water mixed solution of phosphoric acid, acetic acid, nitric acid, pure water, etc. Further, in FIG. 6(*c*), the resist 8-1 is removed using an exfoliation solution such as organic solvent to thereby form the wiring electrode 4*a*. This wiring electrode 4*a* thus formed is a first stage. Next, in FIG. 6(*d*), a photo-resist is coated again so as to form a second stage of the wiring electrode 4*a*, after which the photo-resist is exposure developed using a photo-mask whose exposure pattern contour has been reduced 5 μm or more compared to the contour of the wiring electrode 4*a* that has been formed as the first stage of the wiring electrode 4*a*, to thereby form a resist 8-2 whose configuration corresponds to that of the wiring electrode as the second stage. Next, in FIG. 7(*a*), etching is performed using an etching solution that consists of, for example, an acidic water mixed solution of phosphoric acid, acetic acid, nitric acid, pure water, etc. At this time, by completing the etching in 10 to 90% of the thickness of the film, it is possible to impart a step 6 with respect to the wiring electrode 4*a*. Thereafter, in FIG. 7(*b*), the resist 8-2 is removed using an exfoliation solution such as organic solvent to thereby form the two staged wiring electrode 4*a*. It is also possible to form a three or more staged wiring electrode 4*a* by repeated performance of the above-mentioned steps. Lastly, the protective film 9 is formed. The structure illustrated in FIG. 7(*c*) is one that has been obtained by forming the protective film 9 on the wiring electrode 4*a* that has been obtained in this embodiment. The fact that the level difference of the protective film 9 has been made smaller than in the prior art has been confirmed. It is to be noted that it is confirmed that the level difference of the protective film is smaller when the level difference of the wiring electrode 4*a* is three staged than when this level difference is two staged. That is, by the wiring electrode 4*a* being two or three staged, the same effect as that attainable with tapering of the electrode is obtained.

[Fifth Embodiment]

Next, the manufacturing process steps wherein the photoresist developing and etching steps are each performed a plurality of times as illustrated in FIGS. 8(*a*) to 8(*d*) to thereby make the peripheral edge portion of the wiring electrode multistage, thereby obtaining an effect similar to that attainable with tapering of the peripheral configuration of the wiring electrode will be explained.

In FIG. 8(*a*), as in the case of the first embodiment, the glaze 2 is formed on the insulative substrate 1 such as that made of alumina ceramics or the like and on the resulting structure there is formed the heat generating resistor 3. On the resulting structure there is formed by sputtering to a thickness of from 1 to 2 μm a film that has Al as a main component and that serves as an electrode material for supplying power to the heat generating resistor 3. Thereafter, a resist 8 is formed, and then, in FIG. 8(*b*), etching is performed 10 to 90% with respect to the film thickness by using an etching solution that consists of, for example, an acidic water mixed solution of phosphoric acid, acetic acid, nitric acid, pure water, etc. and is finished as is.

Further, thereafter, in the conventional process, the resist 8 is removed using an exfoliation solution such as organic solvent to thereby form the wiring electrode 4*a*. However, in this embodiment, since a developing solution has a feature of causing a reduction in amount of the resist 8, ordinary etching is first performed and then the resulting structure is immersed again in the developing solution to thereby perform second-time development for causing a forced reduction in amount thereof and thereby retreat the resist 8 by a distance of 5 μm or more as illustrated in FIG. 8(*c*). Next, in FIG. 8(*d*), etching is performed using an etching solution that consists of, for example, an acidic water mixed solution of phosphoric acid, acetic acid, nitric acid, pure water, etc. and this etching is finished to thereby form a multistage portion 6 with respect to the wiring electrode. Thereafter, in FIG. 9(*a*), the resist 8 is removed using an exfoliation solution such as organic solvent to thereby form the two staged wiring electrode 4*a*.

Further, by repeated performance of the above-mentioned steps it is also possible to form a three or more staged wiring electrode 4*a*. Lastly, the protective film 9 is formed.

Figure 9A:
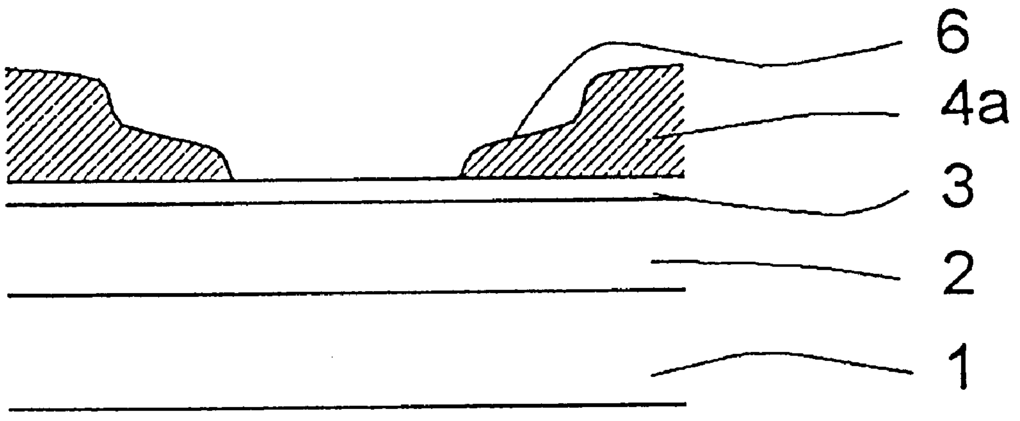
FIGS. 9(*a*) and 9(*b*) are explanatory views illustrating manufacturing process steps for manufacturing the thermal head according to the present invention.
Figure 9B:
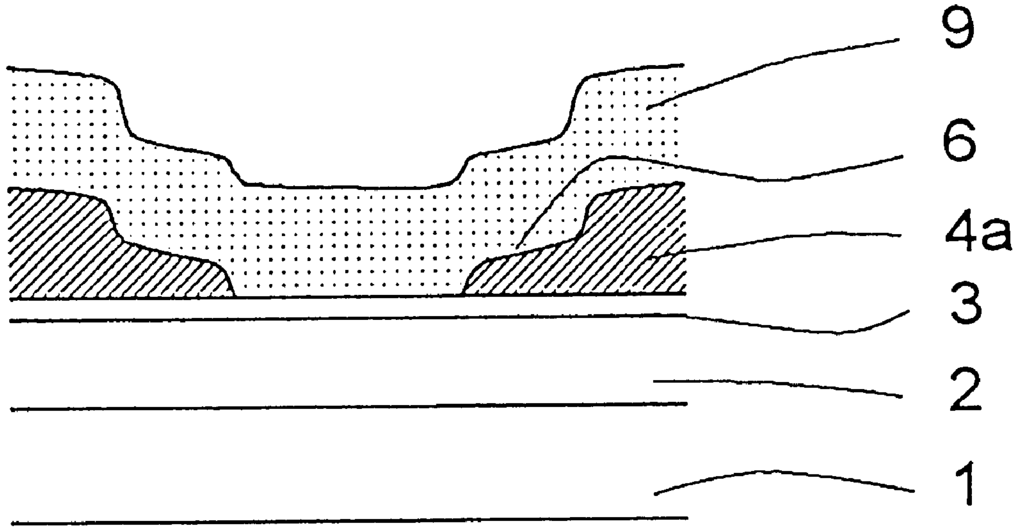
Figure 10:
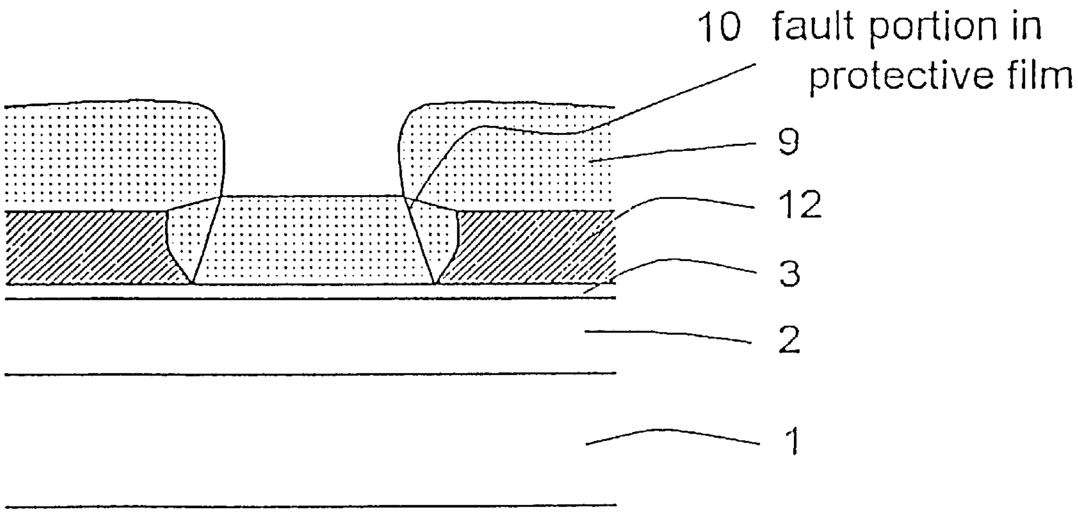
F I G. 1 0 (a) (PRIOR ART)
FIGS. 10(*a*) and 10(*b*) are an enlarged sectional view illustrating a heat generating portion of a conventional thermal head and a sectional view illustrating peripheral edge portions of electrodes thereof respectively.
Figure 10:
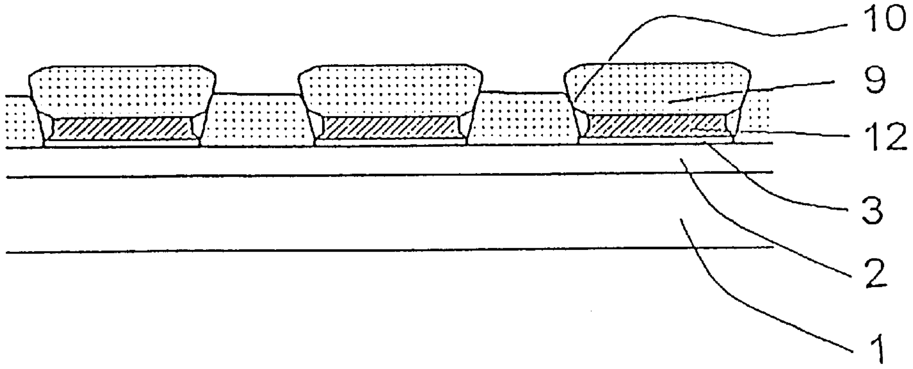
F I G. 1 0 (b) (PRIOR ART)

The structure illustrated in FIG. 9(*b*) is one that has been obtained by forming the protective film 9 on the wiring electrode 4*a* having been obtained in this embodiment. By the extent to which the level difference of the peripheral edge portion of the wiring electrode has changed into a stepped configuration of level difference, the level difference of the protective film is made to be less sharp and in addition the fault thereof that corresponds to the peripheral edge of the wiring electrode is also suppressed. It is to be noted that the level difference of the wiring electrode 4*a* in each stage is smaller when this wiring electrode 4*a* is three staged than when it is two staged and that, accordingly, the clothability of the protective film is enhanced more in the former case than in the latter. According to the experiments performed by the present inventors, when forming the protective film by an ordinary sputtering method, the clothability of the protective film over the level difference portion, i.e., whether or not there occurs the fault of the protective film at the level difference portion, remarkably changed depending on whether or not the level difference constituting one stage was to an extent of 0.2 to 0.3 $\mu$m. Accordingly, it is preferable that each level difference be suppressed to a value of 0.3 $\mu$m or less.

[Evaluations On Each Embodiment]

The results of evaluation on each of the above-mentioned embodiments will hereafter be explained with reference to the tables in FIGS. 17 and 18 which show quality levels of characteristics (e.g., printing durability, resistance to scratch, etc.) of the thermal head at various taper angles 7 shown in FIG. 1. Legends "x", "Δ", "○" and "◎" in the tables of FIGS. 17 and 18 represent the quality levels in descending order with "x" representing a low quality level and "◎" representing a high quality level.

In a table in FIG. 17, there are shown the results of evaluation on the present embodiments when the taper angle 7 in FIG. 1 has been varied.

In the table in FIG. 17, the "resistance to pulse" is an item of evaluation that is obtained by applying a voltage pulse to the heat generating resistor and determining the degree of change in the resistance value thereof with respect to the number of the pulses applied. The "resistance to corrosion" is an item of evaluation that is obtained by causing the thermal head to contact with a thermosensible paper or chemicals at high temperature and under high humidity and determining whether or not the electrodes are corroded and whether or not the protective film is exfoliated. The "resistance to scratch" is an item of evaluation that is obtained by scratching by use of, for example, sand paper the protective film that includes a portion thereof that is located on the wiring electrodes in the vicinity of the heat generating resistor and thereby evaluating the exfoliation of this protective film. The "printing durability" was evaluated in the percentage of troubles that occurred when continuous printing was performed using a highly wearable poor thermosensible paper containing a large amount of corroding impurities.

From the table in FIG. 17, it can be confirmed that when the taper angle 7 is lower than a border of from 60 to 30 deg., each of the characteristics is rapidly improved. While in the thermal head during a printing run thereof in particular high stresses are produced in the heat generating portion and the peripheral edge portion of the wiring electrode in the vicinity of the heat generating resistor due to heat generated from the heat generating resistor, pressure of the platen roller, sliding movement of the thermosensible paper, etc., as apparent from the table in FIG. 17 the synthetic printing durability that involves therein adverse effects resulting therefrom exhibits a very excellent level when the taper angle is 15 deg. or lower.

While each of the above-mentioned items of evaluation is one that has been obtained when the hardness of the protective film is approximately Hv 1500, the present inventors made their scratch evaluation also on specimens wherein the hardness of the protective film was approximately Hv 900, approximately Hv 1200 and approximately Hv 1800, the results being shown in a table in FIG. 18.

From these results it is understood that in the case of a wiring electrode such as the conventional one whose level difference or taper angle is large and sharp, when it involves scratches, the printing durability does not become very high even when the hardness of the protective film is made to be high. It can be explained that the reason for this is that since the wiring electrode is made of soft material such as Al, the harder the protective film is, when an external force is locally applied thereto by means of a foreign substance or the like the more in the plane direction of the film this force is transmitted with the result that stresses are concentrated more on the fault portion thereof at the peripheral edge of the wiring electrode. Accordingly, the effect of the present invention is especially prominent on a thermal head wherein the hardness of the protective film is Hv 1200 or more. Regarding the resistance to wear, the protective film whose hardness is high is advantageous and, given that the protective film has continuity as viewed in the plane direction, the resistance to scratch also becomes increased as a result. That is to say, when combined with the hardness of the protective film of Hv 1200 or more, the present invention can exhibit the greatest effect.

The results of evaluation on the above-mentioned embodiments that have been obtained when the taper angle 7 is 15 deg. will now be described in detail.

Figure 11:
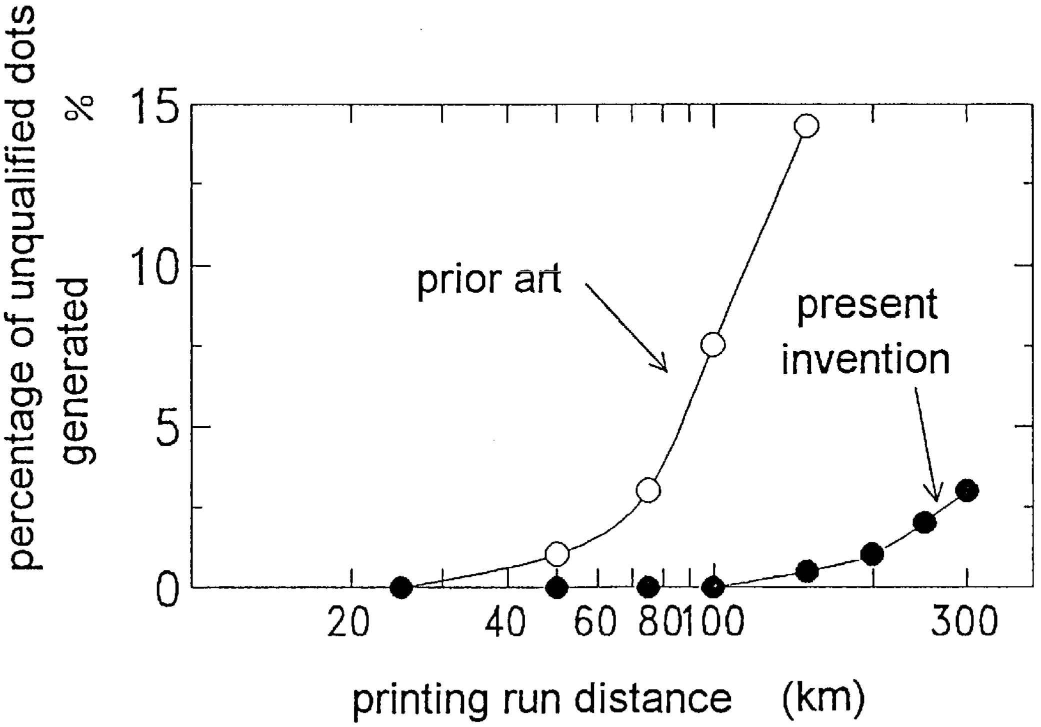
FIG. 11 is a graphic diagram showing results of printing run test on the thermal head according to the present invention.

FIG. 11 shows the results of a printing run duration test that has been performed in the present invention.

In the conventional thermal heads, when the printing run distance has increased up to approximately 50 km or so, exfoliation, chipping-off or the like of the protective film occurs, due to mechanical stress or scratch, from the fault portion thereof that is attributable to the level difference portion of the electrode. As a result, at a point in time when the printing run distance is 100 km, unqualified dots occupied 10% whereas, in the present embodiments, even after a printing run over a distance of 100 km or more, no phenomena such as exfoliation, chipping-off or the like occurred in the protective film. Also, by setting the hardness of the protective film to be Hv 1200 or more, it is possible to suppress the amount of the protective film worn to 2 $\mu$m or less. That is, in the present embodiments, various destructions such as exfoliation, chipping-off, wear and the like of the protective film that were conventionally the causes of damaging the thermal heads can be suppressed by tapering of the electrode and increasing in hardness of the protective film, whereby it can be confirmed that the printing durability becomes four times or more as high as that in the prior art, with the result that the printing run performance is improved.

Figure 12:
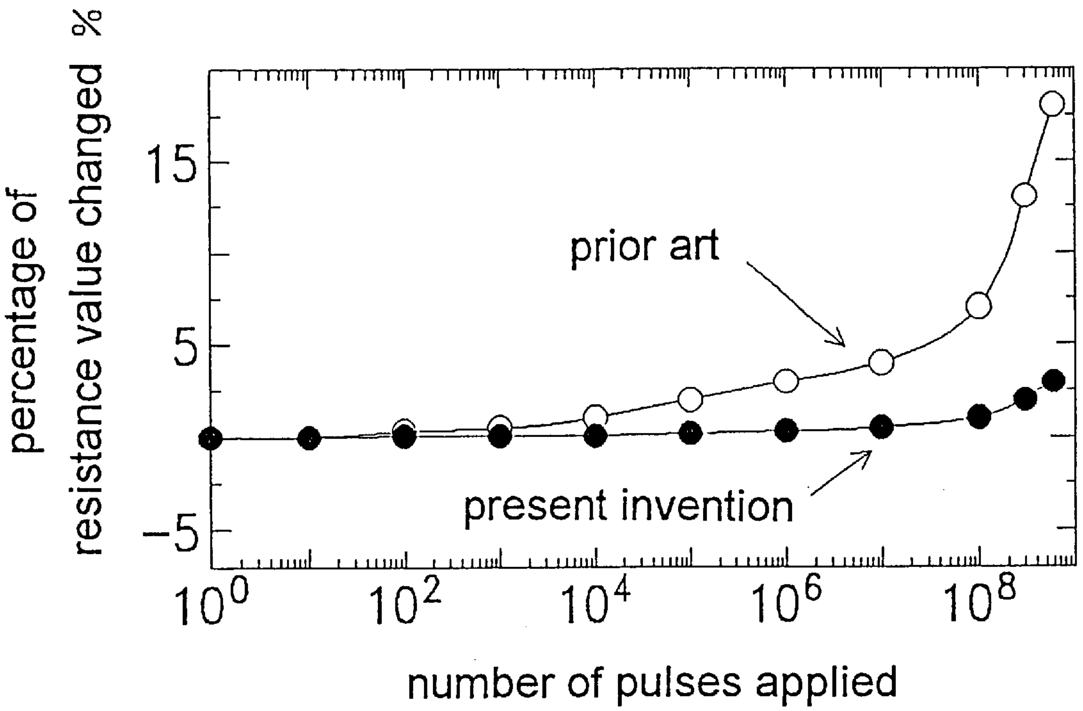
FIG. 12 is a graphic diagram showing results of continuous pulse application test on the thermal head according to the present invention.

In FIG. 12, there are shown the results of continuous pulse application test in order to evaluate the resistance to pulse of the present invention.

In the conventional thermal heads, the increase in the resistance value becomes 5% or so at a pulses number of 1x108 and becomes 15% or more at a pulses number of 6x108. However, in the present embodiments, neither increase nor change in the resistance value is exhibited at even a pulses number of 1x108 and, at even a pulses number of 6x108, the increase in the resistance value is 3% or so, that is, the resistance to pulse is improved. Namely, while conventionally the heat generating resistor became deteriorated due to oxidation or the like by way of the fault portion of the protective film that is attributable to the level difference portion of the electrode, in the present embodiments deterioration of the heat generating resistor has become able to be prevented by tapering of the electrode, whereby it could be confirmed that the resistance to pulse was improved.

Figure 13:
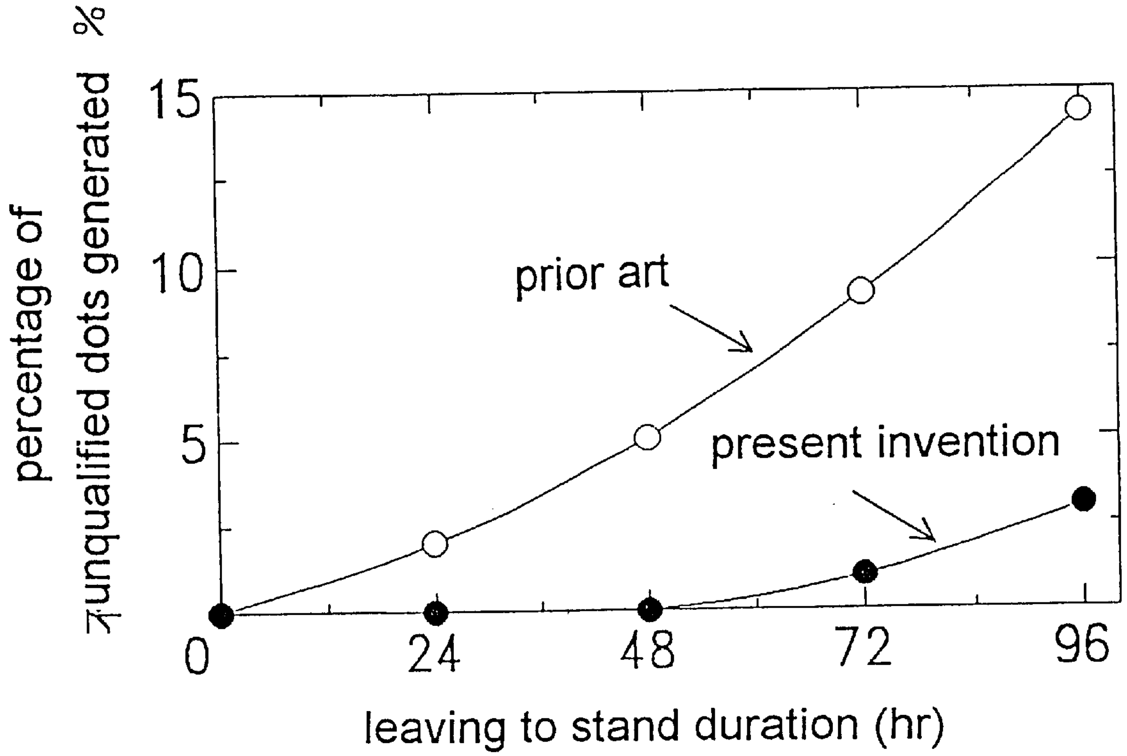
FIG. 13 is a graphic diagram showing results of electrolytic corrosion test on the thermal head according to the present invention.

FIG. 13 shows the results of electrolytic etching test in order to evaluate the resistance to corrosion of the present invention.

The test was performed as a "leaving-to-stand test" under the conditions that the temperature was 85° C., the humidity was 85%, the head voltage was 5 V and the thermosensible paper was kept applied. In the conventional thermal heads, unqualified dots generated were large in amount at an early point in time, were 5% or more in 48 hrs and, after lapse of 96 hrs, were approximately 15% whereas in the present embodiments no unqualified dots were admitted in 48 hrs and, even after lapse of 96 hrs, approximately 3% of unqualified dots were only admitted. Namely, in the present embodiments, it could be confirmed that by tapering of the electrode, moisture, ions of the thermosensible paper, etc. were prevented from easy entry into the thermal head, whereby corrosion of the electrode and the like could be prevented with the result that the resistance to corrosion was improved.

Figure 14:
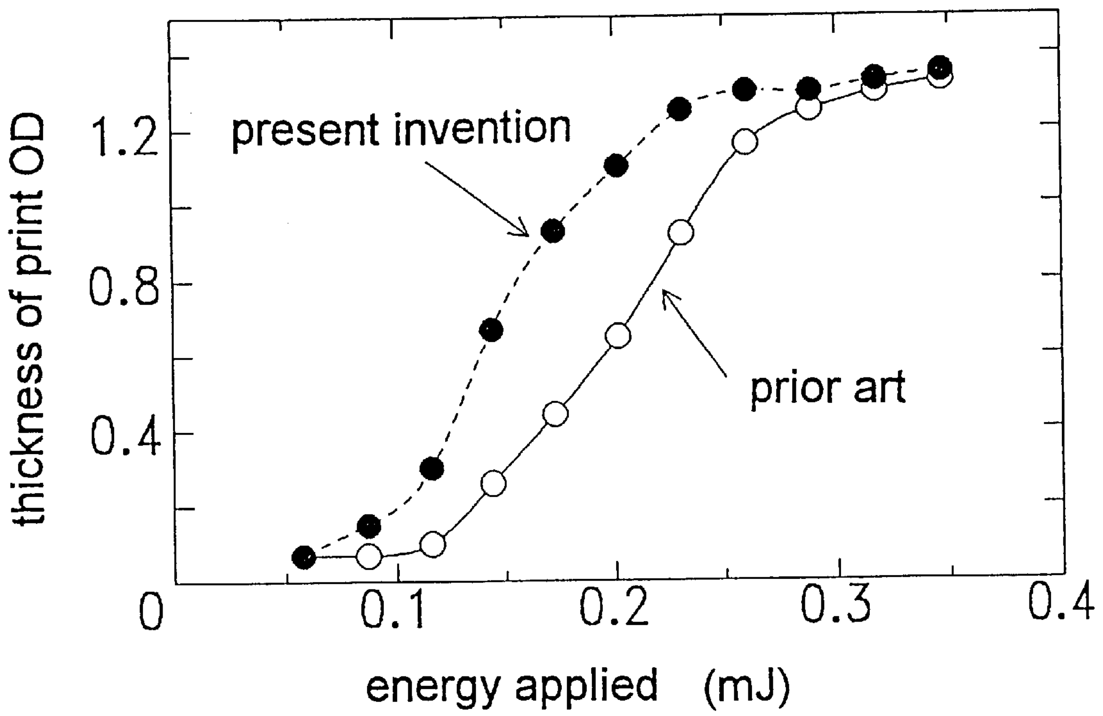
FIG. 14 is a graphic diagram showing results of printing thickness test on the thermal head according to the present invention.
Figure 15:
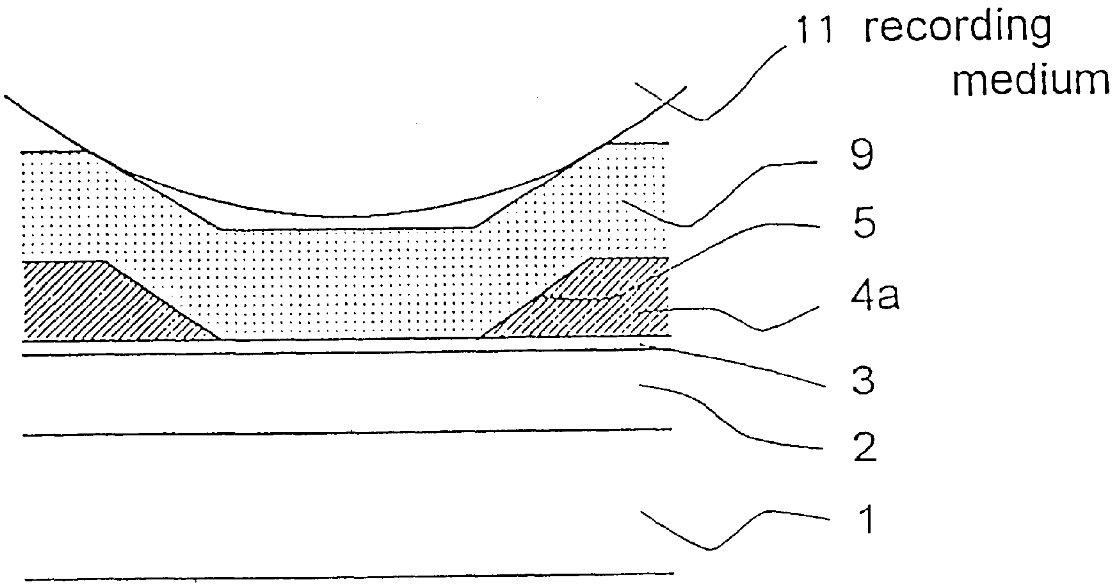
FIG. 15 is a view illustrating a contact portion between the thermal head according to the present invention and a recording medium.
Figure 16:
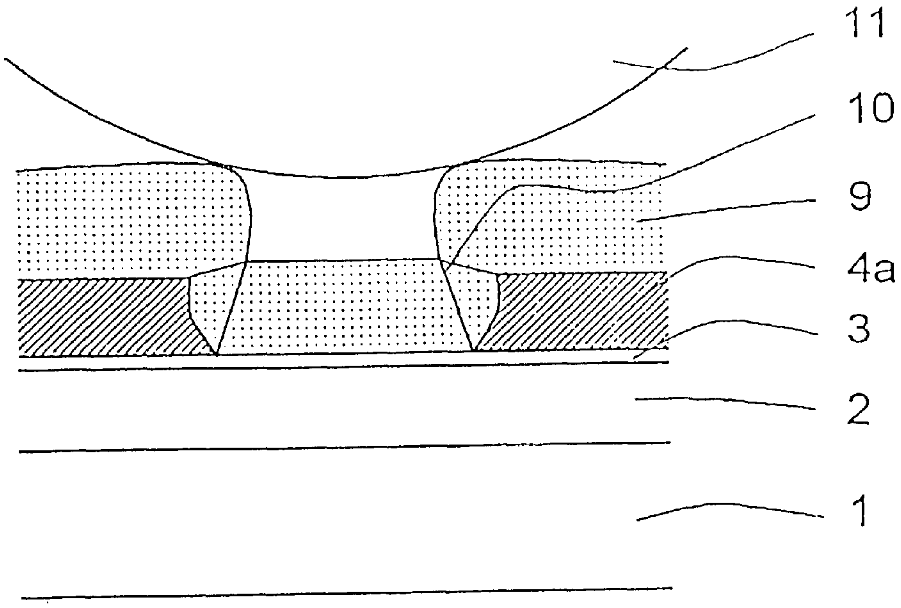
F I G. 1 6 (PRIOR ART)
FIG. 16 is a view illustrating a contact portion between the conventional head and a recording medium.

Also, compared to the sectional structure of the conventional thermal head as illustrated in FIG. 16, more excellent contact between the protective film on the resistor and a recording medium such as a thermosensible paper, platen roller and the like is obtained by tapering the electrode as in the thermal head of the present invention as illustrated in FIG. 15. In FIG. 14 there are shown the results of a print thickness test that has been performed in the present invention.

From the test results it was confirmed that in the present embodiments approximately 20% or more of reduction in the power used was possible even when obtaining the same recorded print thickness as in the prior art, with the result that the efficiency with which the printing heat was generated was improved.

Industrial Utilizability

As explained above, according to the present invention, by the electrode of the thermal head in a region of the protective film thereof having been formed into a tapered configuration, the level difference of this protective film is made to be smaller or less sharp, whereby occurrence of faults therein is suppressed and, particularly by the tapering being combined with the hardness of the protective film that is Hv 1200 or more in terms of the Vickers hardness, the wear resistance is of course improved and further the scratch resistance is also remarkably improved. As a result, the present invention has the advantage of making the printing durability very high and further of also improving the environmental reliability.

Also, the manufacturing method of the present invention that is intended to cause tapering of the sectional configuration of the peripheral edge portion of the wiring electrodes is possible to execute with even no use of a special device such as a bias sputter device. Particularly, if an etching process or other processes wherein necessary features can be imparted to the structure of the electrode are used, the section of the peripheral edge of the electrode can be tapered without causing an increase in the number of the steps.

What is claimed is:

1. A method for manufacturing a thermal head, comprising the steps of:

forming a heat generating resistor over an insulative substrate;

forming a plurality of conductors having different material properties on the heat generating resistor for supplying power to the heat generating resistor, the conductors being formed by disposing a first conductor comprised of a preselected conducting material on the heat generating resistor and disposing a second conductor comprised of an alloy of the preselected conducting material over the first conductor;

etching the first and second conductors by a single etching process so that an etching rate for the second conductor is greater than that for the first conductor to thereby form a wiring electrode having a tapered peripheral edge portion owing to the different material properties of the first and second conductors; and forming a protective film over the heat generating resistor and the wiring electrode.

2. A method as claimed in claim 1; wherein the disposing step comprises disposing conductors having different crystallinity properties.

3. A method as claimed in claim 1; wherein the step of forming the plurality of conductors comprises disposing conductors having different compositions.

4. A method as claimed in claim 1; wherein the etching step comprises forming the tapered peripheral edge portion of the wiring electrode in at least a protective-film region near the heat generating resistor.

5. A method as claimed in claim 1; wherein the etching step comprises etching the first and second conductors to form the wiring electrode with the peripheral edge portion having a tapered angle of 15 degrees or less.

6. A method as claimed in claim 5; wherein the step of forming the protective film comprises forming a protective film having a Vickers hardness of 1200 $Kg/mm^2$ or more.

7. A method as claimed in claim 1; wherein the step of forming the protective film comprises forming a protective film having a Vickers hardness of 1200 $Kg/mm^2$ or more.

8. A method as claimed in claim 1; wherein the preselected conducting material comprises aluminum; and wherein the alloy of the preselected conducting material contains Si, Cu and Ti.

9. A method as claimed in claim 1; wherein the alloy of the preselected conducting material contains Al, Si, Cu and Ti.

10. A method for manufacturing a thermal head, comprising the steps of:

forming a heat generating resistor over an insulative substrate;

forming a first conductor comprised of a preselected conducting material on the heat generating resistor;

forming a second conductor comprised of an alloy of the preselected conducting material over the first conductor;

etching the first and second conductors by a single etching process so that an etching rate for the second conductor is greater than that for the first conductor to thereby form a wiring electrode having a tapered peripheral edge portion; and forming a protective film over the heat generating resistor and the wiring electrode so that the tapered peripheral edge portion of the wiring electrode is disposed at least in a region of the protective film near the heat generating resistor.

11. A method as claimed in claim 10; wherein the etching step comprises etching the first and second conductors to form the wiring electrode with the peripheral edge portion having a tapered angle of 15 degrees or less.

12. A method as claimed in claim 11; wherein the step of forming the protective film comprises forming a protective film having a Vickers hardness of 1200 $Kg/mm^2$ or more.

13. A method as claimed in claim 10; wherein the step of forming the protective film comprises forming a protective film having a Vickers hardness of 1200 $Kg/mm^2$ or more.

* * * * *